(12) United States Patent
Chang et al.

(10) Patent No.: US 11,785,658 B2
(45) Date of Patent: Oct. 10, 2023

(54) METHOD AND APPARATUS FOR PERFORMING INTERNET REACHABILITY MANAGEMENT WITH AID OF INDICATOR

(71) Applicant: MEDIATEK INC., Hsin-Chu (TW)

(72) Inventors: Hui-Ling Chang, Hsinchu (TW); Po-Chun Lee, Hsinchu (TW); Yuh-Hua Hu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/357,975

(22) Filed: Jun. 24, 2021

(65) Prior Publication Data

US 2022/0418016 A1  Dec. 29, 2022

(51) Int. Cl.

| | | |
|---|---|---|
| *H04W 76/15* | (2018.01) | |
| *G06F 3/04817* | (2022.01) | |
| *H04L 43/50* | (2022.01) | |
| *H04L 61/251* | (2022.01) | |
| *H04L 69/18* | (2022.01) | |
| *H04L 101/686* | (2022.01) | |
| *H04L 67/54* | (2022.01) | |
| *H04W 76/30* | (2018.01) | |
| *H04L 101/659* | (2022.01) | |
| *H04L 43/10* | (2022.01) | |
| *H04W 36/00* | (2009.01) | |
| *H04W 76/19* | (2018.01) | |
| *H04L 43/0811* | (2022.01) | |
| *H04L 61/4511* | (2022.01) | |
| *H04W 76/18* | (2018.01) | |
| *H04W 36/14* | (2009.01) | |
| *H04W 76/10* | (2018.01) | |

(52) U.S. Cl.
CPC ........ *H04W 76/15* (2018.02); *G06F 3/04817* (2013.01); *H04L 43/50* (2013.01); *H04L 61/251* (2013.01); *H04L 67/54* (2022.05); *H04L 69/18* (2013.01); *H04W 76/30* (2018.02); *H04L 2101/659* (2022.05); *H04L 2101/686* (2022.05)

(58) Field of Classification Search
None
See application file for complete search history.

(56) References Cited

U.S. PATENT DOCUMENTS

| | | |
|---|---|---|
| 10,257,159 B2 | 4/2019 | Kim |
| 10,833,923 B2 | 11/2020 | Trivedi |
| 2004/0143579 A1* | 7/2004 | Nakazawa .......... H04L 61/4535 |

(Continued)

*Primary Examiner* — John A Follansbee
*Assistant Examiner* — Kamal M Hossain
(74) *Attorney, Agent, or Firm* — Winston Hsu (57) ABSTRACT

A method for performing Internet reachability management and associated apparatus are provided. The method may include: establishing, by a processor of the UE, a first connection to a first access device; receiving, by the processor, an indicator complying with a first protocol sent from the first access device; in response to receiving the indicator, performing, by the processor, a reachability detection complying with a second protocol to generate a detection result; and in response to the detection result representing that a network is not reachable, performing at least one of: displaying, by a display of the UE, a message or icon to represent the first connection or the network is unavailable; disconnecting, by the processor, the first connection; and establishing, by the processor, a second connection to a second access device.

14 Claims, 5 Drawing Sheets

(56) References Cited

U.S. PATENT DOCUMENTS

| | | | |
|---|---|---|---|
| 2005/0138166 A1* | 6/2005 | Blanchet | H04L 69/167 703/2 |
| 2008/0113683 A1* | 5/2008 | Paas | H04M 1/724 455/566 |
| 2012/0140651 A1* | 6/2012 | Nicoara | H04W 48/18 370/252 |
| 2013/0279367 A1* | 10/2013 | Sarikaya | H04L 45/72 370/467 |
| 2013/0282498 A1* | 10/2013 | Korhonen | H04L 45/026 705/14.73 |
| 2016/0164831 A1* | 6/2016 | Kim | H04L 67/56 709/223 |
| 2016/0234749 A1* | 8/2016 | Singh | H04W 36/0022 |
| 2021/0152644 A1* | 5/2021 | Prodoehl | H04L 67/60 |

* cited by examiner

METHOD AND APPARATUS FOR PERFORMING INTERNET REACHABILITY MANAGEMENT WITH AID OF INDICATOR

BACKGROUND

The present invention relates to network control mechanism, and more particularly, to a method for performing Internet reachability management, and associated apparatus such as a user equipment (UE), an access device (e.g., a router), etc.

According to the related art, because of Internet Protocol version 4 (IPv4) address exhaustion, most hosts may be arranged to use local addresses to prevent any address confliction. For example, a host in a private network connected to an IPv4 router may access a public network through the IPv4 router. If disconnection occurs in the public network, any of the nodes in the private network, such as the host, typically has no way to be aware of this. From the view of the nodes, they are still able to deliver packets to the IPv4 router. For example, the host may deliver a packet to the IPv4 router and wait for a long time. As a result, some operations of the host may be delayed. Hence, there is a need for a novel method and associated architecture to enhance the overall performance of an electronic device without introducing a side effect or in a way that is less likely to introduce a side effect.

SUMMARY

It is therefore an objective of the present invention to provide a method for performing Internet reachability management, and to provide associated apparatus such as a user equipment (UE), an access device (e.g., a router), etc., in order to solve the above-mentioned problems.

At least one embodiment of the present invention provides a method for performing Internet reachability management, where the method is applied to a UE. The method may comprise: establishing, by a processor of the UE, a first connection to a first access device; receiving, by the processor, an indicator complying with a first protocol sent from the first access device; in response to receiving the indicator, performing, by the processor, a reachability detection complying with a second protocol to generate a detection result; and in response to the detection result representing that a network is not reachable, performing at least one of: displaying, by a display of the UE, a message or icon to represent the first connection or the network is unavailable; disconnecting, by the processor, the first connection; and establishing, by the processor, a second connection to a second access device.

At least one embodiment of the present invention provides a UE, where the UE may comprise a processor arranged to control operations of the UE. For example, the processor establishes a first connection to a first access device; the processor receives an indicator complying with a first protocol sent from the first access device; in response to receiving the indicator, the processor performs a reachability detection complying with a second protocol to generate a detection result; and in response to the detection result representing that a network is not reachable, the processor performs at least one of: displaying, by using a display of the UE, a message or icon to represent the first connection or the network is unavailable; disconnecting the first connection; and establishing a second connection to a second access device.

At least one embodiment of the present invention provides a method for performing Internet reachability management, where the method can be applied to an access device. The method may comprise: establishing, by a processor of the access device, a connection to a user equipment (UE) and a connection to a network, whereby the UE is able to access the network through the access device; transmitting, by the processor, an indicator complying with a first protocol to the UE when the connection to the network is disconnected; receiving, by the processor, data complying with a second protocol from the UE after the transmitting of the indicator; and transmitting the data toward the network according to a destination of the data.

According to some embodiments, the present invention also provides the access device that operates according to the method.

The present invention method and associated apparatus (e.g., the UE, and the first access device such as a router) can guarantee that the UE can operate properly in various situations, respectively. In addition, the present invention method and associated apparatus can start performing the reachability detection as soon as possible, for example, at the moment of receiving the indicator, to perform at least one associated operation, having no need to wait for any periodic check (if the any periodic check exists). For example, the UE can re-reach the Internet instantly without being delayed by a next cycle of the any periodic check. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method for performing Internet reachability management and associated apparatus such as a UE, an access device (e.g., a router), etc. The UE can perform the Internet reachability management with aid of at least one indicator (e.g., one or more indicators) sent from the access device, and more particularly, can start performing reachability detection as soon as possible (e.g., at the moment of receiving the above-mentioned at least one indicator) to perform at least one associated operation, having no need to wait for any periodic check (if the any periodic check exists). For example, the UE can re-reach the Internet instantly without being delayed by a next cycle of the any periodic check. In comparison with the related art, the present invention method and associated apparatus can enhance overall performance without introducing any side effect or in a way that is less likely to introduce a side effect.

Figure 1:
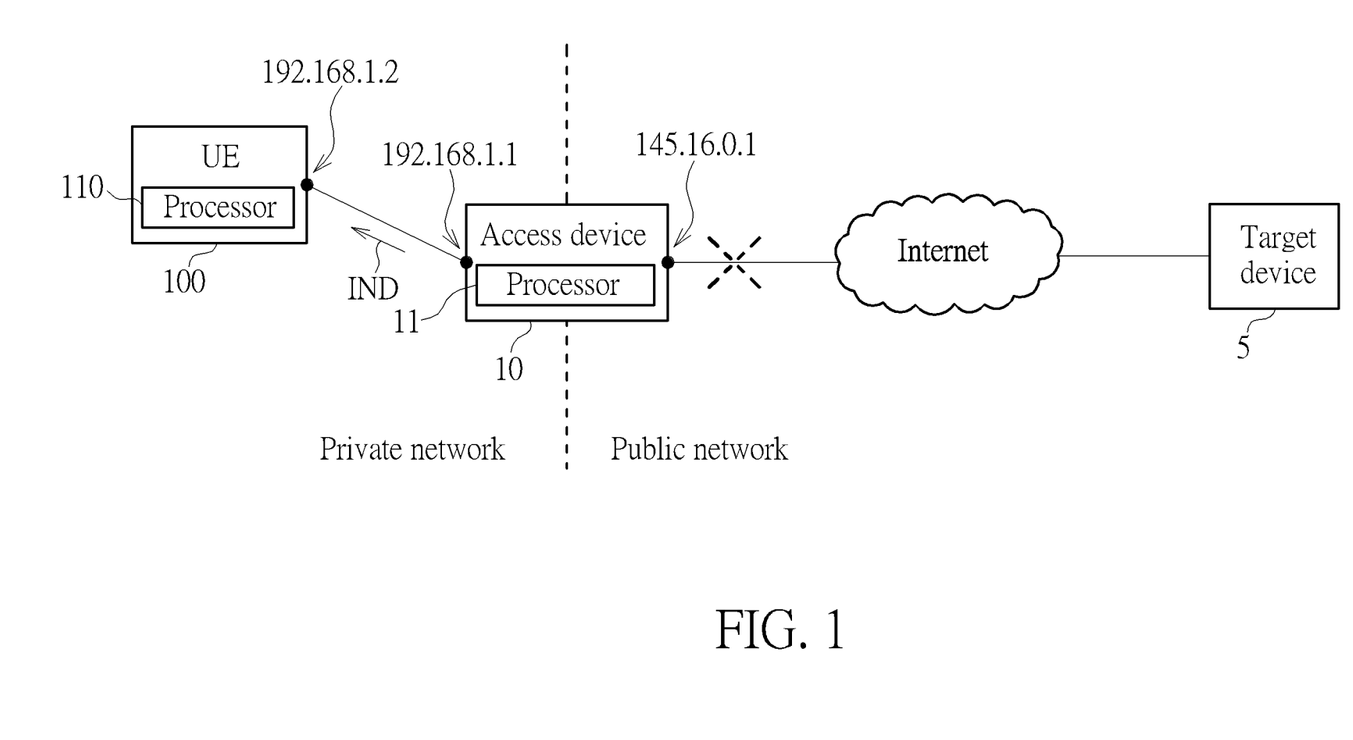
FIG. 1 is a diagram of a UE and associated devices in a private network or a public network according to an embodiment of the present invention.

FIG. 1 is a diagram of a UE 100 and associated devices in a private network or a public network according to an embodiment of the present invention, where the associated devices may comprise an access device 10 and a target device 5. The UE 100 and the access device 10 can be taken as examples of the UE and the access device mentioned above. The UE 100 may comprise at least one processor (e.g., one or more processor), which can be collectively referred to as the processor 110, for controlling operations of the UE 100, and may comprise other components such as one or more Radio Frequency (RF) modules and one or more antennas (not shown in FIG. 1) for performing wireless communications. In addition, the access device 10 may comprise a processor 11 for controlling operations of the access device 10, and may comprise other components such as one or more RF modules and one or more antennas (not shown) performing wireless communications, and may further comprise a wired network interface circuit for performing wired communications via a network cable coupled between the access device 10 (e.g., the wired network interface circuit) and a certain network access device in the public network.

For better comprehension, the access device 10 may have its own local address such as 192.168.1.1 in the private network to communicate with the UE 100, and may have its own global address such as 145.16.0.1 in the public network to communicate with the Internet, but the present invention is not limited thereto. For example, the local address and the global address of the access device 10 may vary. In addition, when the public network operates normally, the UE 100 at a local address such as 192.168.1.2 in the private network may access the Internet through the access device 10, and another device (if it exists) at another local address such as 192.168.1.3 in the private network may access the Internet through the access device 10, but the present invention is not limited thereto. For example, the local addresses may vary. Additionally, the access device 10 can perform network address translation (NAT) between the private network and the public network, and more particularly, perform mapping from an IP address space into another IP address space by modifying network address information in the IP header of packets while the packets are in transit across the access device 10.

As shown in FIG. 1, an X-shaped symbol depicted with dashed lines can be used for indicating that disconnection occurs in the public network, and the aforementioned at least one indicator can be collectively referred to as the indicator IND. When the disconnection occurs in the public network, the access device 10 can send the aforementioned at least one indicator such as the indicator IND to the UE 100, and the UE 100 can start performing the reachability detection as soon as possible, for example, at the moment of receiving the indicator IND, to perform the aforementioned at least one associated operation, having no need to wait for any periodic check regarding Internet reachability (if the any periodic check exists). The aforementioned at least one associated operation may comprise controlling the UE 100 to access the Internet through another access device of another Radio Access Technology (RAT). For example, when the UE 100 is trying to access the target device 5, this accessing operation will not be hindered by the disconnection mentioned above, and will not be delayed by the any periodic check. As a result, the overall performance can be enhanced.

Figure 2:
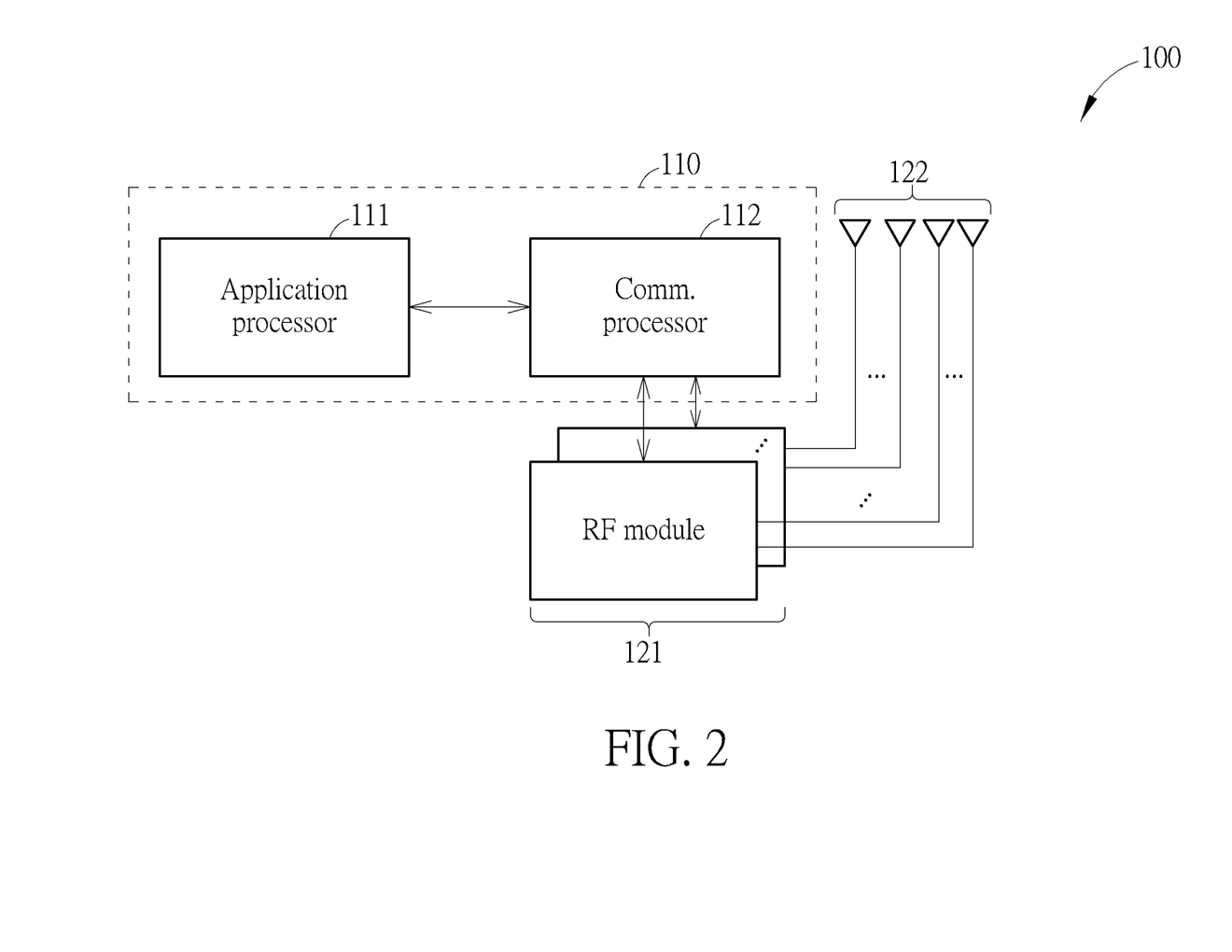
FIG. 2 illustrates some components of the UE shown in FIG. 1 according to an embodiment of the present invention.

FIG. 2 illustrates some components of the UE 100 shown in FIG. 1 according to an embodiment of the present invention. The aforementioned at least one processor (e.g., the one or more processors) such as the processor 110 may comprise an application processor 111 (e.g., a processor running program codes such as an Operation System (OS), drivers, and application programs) and a communications processor 112 (labeled "Comm. processor" for brevity). In addition, the one or more RF modules of the UE 100 can be implemented as a plurality of RF modules 121 that are coupled to the communications processor 112, and the one or more antennas of the UE 100 can be implemented as a plurality of antennas 122 that are respectively coupled to the plurality of RF modules 121, where the plurality of antennas 122 may comprise multiple sets of antennas, and any set of antennas (e.g., two or more antennas) among the multiple sets of antennas are coupled to a corresponding RF module among the RF modules 121.

The application processor 111 can be configured to control operations of the UE 100, and the communications processor 112 can be configured to control the plurality of RF modules 121 to perform the wireless communications for the UE 100. For better comprehension, a modulator-demodulator (Modem) of the UE 100 may comprise the communications processor 112, the plurality of RF modules 121 and the plurality of antennas 122, but the present invention is not limited thereto. According to some viewpoints, the plurality of antennas 122 may be regarded as external components of the Modem. In the architecture shown in FIG. 2, the connection between the application processor 111 and the communications processor 112 can be implemented by way of Cross Core Communication Interface (CCCI), etc., the communications processor 112 can be implemented by way of baseband (BB) processing circuit, etc., and the plurality of RF modules 121 can be implemented by way of mixers, amplifiers, oscillators, etc., but the present invention is not limited thereto. For brevity, similar descriptions for this embodiment are not repeated in detail here.

Figure 3:
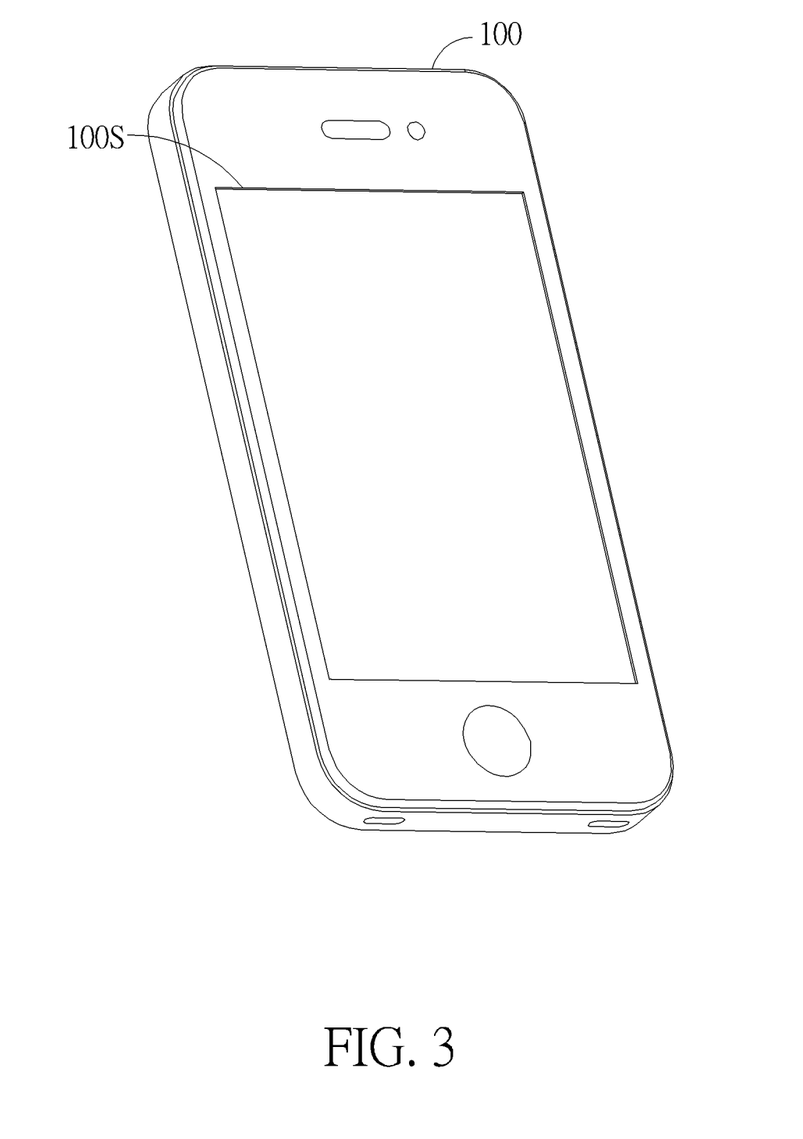
FIG. 3 illustrates some implementation details of the UE shown in FIG. 1 according to an embodiment of the present invention.

FIG. 3 illustrates some implementation details of the UE 100 shown in FIG. 1 according to an embodiment of the present invention. The UE 100 may be implemented as a multifunctional mobile phone, and may comprise a display such as a touch-sensitive display panel 100S (e.g., a touch screen). For brevity, similar descriptions for this embodiment are not repeated in detail here.

Figure 4:
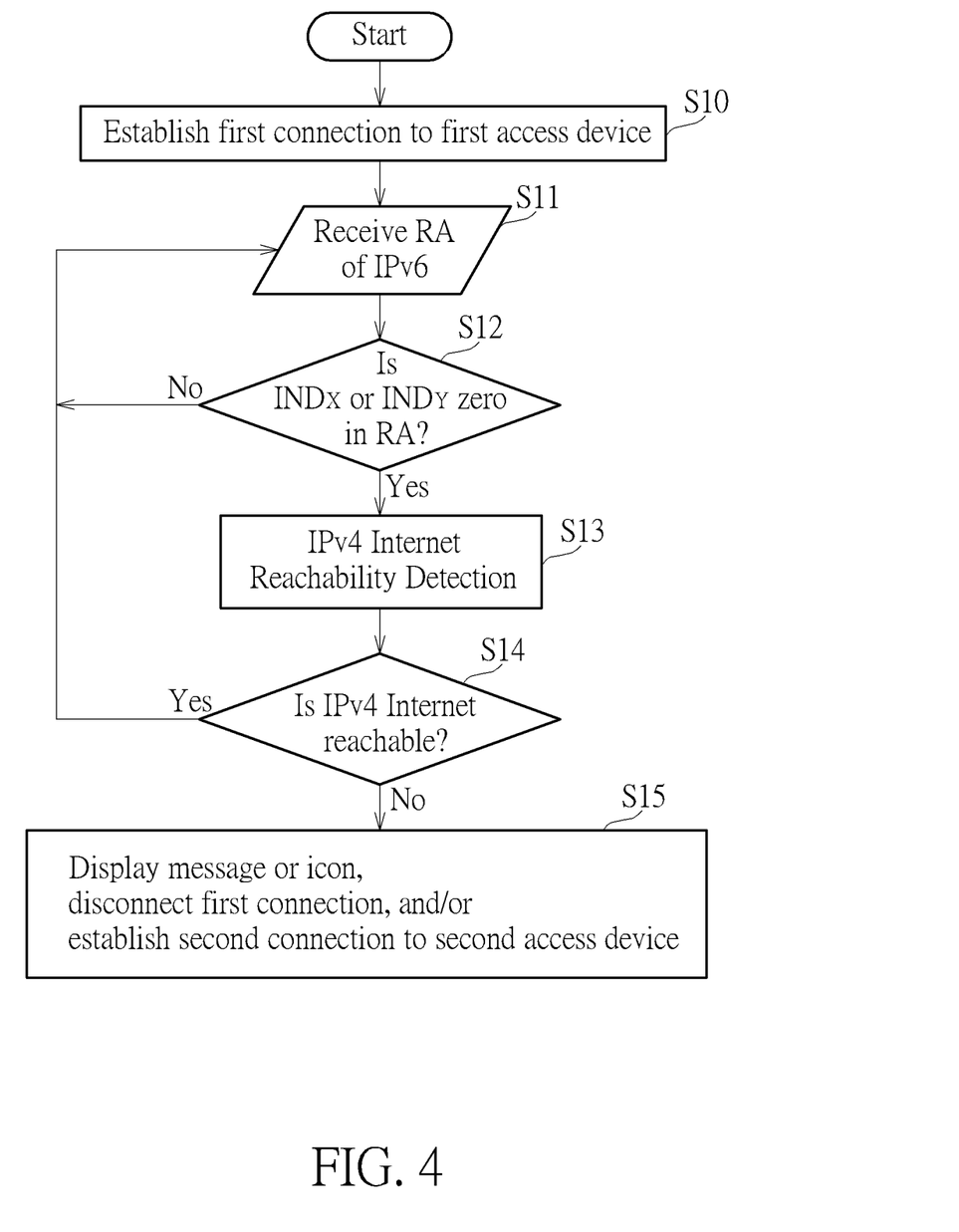
FIG. 4 illustrates a working flow of a method for performing Internet reachability management according to an embodiment of the present invention.

FIG. 4 illustrates a working flow of the method for performing the Internet reachability management according to an embodiment of the present invention, where the method can be applied to the UE 100, and can be executed by the UE 100, and more particularly, the processor 110.

In Step S10, the UE 100 (e.g., the processor 110) can establish a first connection to a first access device such as the access device 10.

In Step S11, the UE 100 (e.g., the processor 110) can receive an indicator complying with a first protocol such as Internet Protocol version 6 (IPv6) that is sent from the first access device (e.g., the indicator IND sent from the access device 10), and more particularly, can receive a router advertisement (RA) message of IPv6 (labeled "RA of IPv6" for brevity, since the RA message can be simply referred to as the RA), where the RA may carry the indicator IND.

The indicator complying with the first protocol such as IPv6 (e.g., the indicator IND) may comprise a parameter representing a router lifetime or a prefix information lifetime in the RA message. For example, the aforementioned at least one indicator (e.g., the one or more indicators) such as the indicator IND may comprise an indicator $IND_X$ and/or an indicator $IND_Y$, where the indicator $IND_X$ may represent the router lifetime, and the indicator $IND_Y$ may represent the prefix information lifetime.

In Step S12, the UE 100 (e.g., the processor 110) can check whether the indicator $IND_X$ or the indicator $IND_Y$ is zero in the RA (e.g., the RA message that is just received in Step S11). If Yes, Step S13 is entered; if No (e.g., none of the indicators $IND_X$ and $IND_Y$ is equal to zero), Step S11 is entered. For example, if any of the indicators $IND_X$ and $IND_Y$ is equal to zero (e.g., $IND_X=0$ and/or $IND_Y=0$), the UE 100 (e.g., the processor 110) can execute Step S13; otherwise, the UE 100 (e.g., the processor 110) can execute Step S11 to wait for the next RA.

In Step S13, in response to receiving the indicator complying with the first protocol such as IPv6 (e.g., the indicator IND, such as the indicator $IND_X$ and/or the indicator $IND_Y$), the UE 100 (e.g., the processor 110) can perform a reachability detection complying with a second protocol such as Internet Protocol version 4 (IPv4) (labeled "IPv4 Internet Reachability Detection" for brevity), to generate a detection result.

For better comprehension, the reachability detection complying with the second protocol such as IPv4 may comprise at least one operation (e.g., one or more operations) of the following operations:

(1) detecting whether a Hypertext Transfer Protocol (HTTP) server can be reached, where the UE 100 (e.g., the processor 110) can try accessing the HTTP server and detect whether this accessing operation is successful, to determine whether the HTTP server is reachable;

(2) detecting whether a Hypertext Transfer Protocol Secure (HTTPs) server can be reached, where the UE 100 (e.g., the processor 110) can try accessing the HTTPs server and detect whether this accessing operation is successful, to determine whether the HTTPs server is reachable;

(3) detecting whether a Domain Name System (DNS) server can be reached, where the UE 100 (e.g., the processor 110) can try accessing the DNS server and detect whether this accessing operation is successful, to determine whether the DNS server is reachable;

(4) performing a Dead Peer Detection of Internet Key Exchange version 2 (DPD of IKEv2); and (5) performing an Internet Control Message Protocol (ICMP) ping;

but the present invention is not limited thereto.

In Step S14, based on the detection result, the UE 100 (e.g., the processor 110) can check whether a network such as the Internet is reachable. If Yes, Step S11 is entered; if No, Step S15 is entered. For example, in response to the detection result representing that the network such as the Internet is reachable, the UE 100 (e.g., the processor 110) can execute Step S11 to wait for the next RA. For another example, in response to the detection result representing that the network such as the Internet is not reachable, the UE 100 (e.g., the processor 110) can execute Step S15.

In Step S15, the UE 100 (e.g., the processor 110) can perform at least one operation (e.g., one or more operations) of the following operations:

(1) displaying, by using the display (e.g., the touch-sensitive display panel 100S) of the UE 100, a message or icon to represent that the first connection or the network is unavailable, for notifying the user (i.e., the user of the UE 100) of this situation, that is, the first connection or the network is unavailable;

(2) disconnecting the first connection, for saving power; and (3) establishing a second connection to a second access device;

where the UE 100 can perform at least one portion (e.g., a portion or all) of the above operations (labeled "Display message or icon, disconnect first connection, and/or establish second connection to second access device" for brevity). When at least the last two operations of the above operations are performed, the UE 100 (e.g., the processor 110) can re-reach the Internet to operate without being hindered by the disconnection. For example, when the UE 100 is trying to access the target device 5, this accessing operation will not be hindered by the disconnection mentioned above, and will not be delayed by the any periodic check. As a result, the overall performance can be enhanced. For brevity, similar descriptions for this embodiment are not repeated in detail here.

For better comprehension, the method may be illustrated with the working flow shown in FIG. 4, but the present invention is not limited thereto. According to some embodiments, one or more steps may be added, deleted, or changed in the working flow shown in FIG. 4.

According to some embodiments, the first connection may use a non 3rd Generation Partnership Project (non-3GPP) access. For example, the first connection may represent a Wi-Fi connection between the UE 100 and the first access device such as the access device 10. In addition, the second connection may use a 3rd Generation Partnership Project (3GPP) access or another non-3GPP access. For example, when the second access device represents another access device that is similar to the access device 10 (e.g., another router that is similar to the router mentioned above), the second connection may represent a Wi-Fi connection between the UE 100 and the second access device, but the present invention is not limited thereto. For some other examples, when the second access device represents a network access device (e.g., a base station of a cell) in a 3GPP network, the second connection may represent a connection implemented by way of technologies such as 4th Generation Long Term Evolution (4G LTE), 5th Generation New Radio (5G NR), etc. For brevity, similar descriptions for these embodiments are not repeated in detail here.

Figure 5:
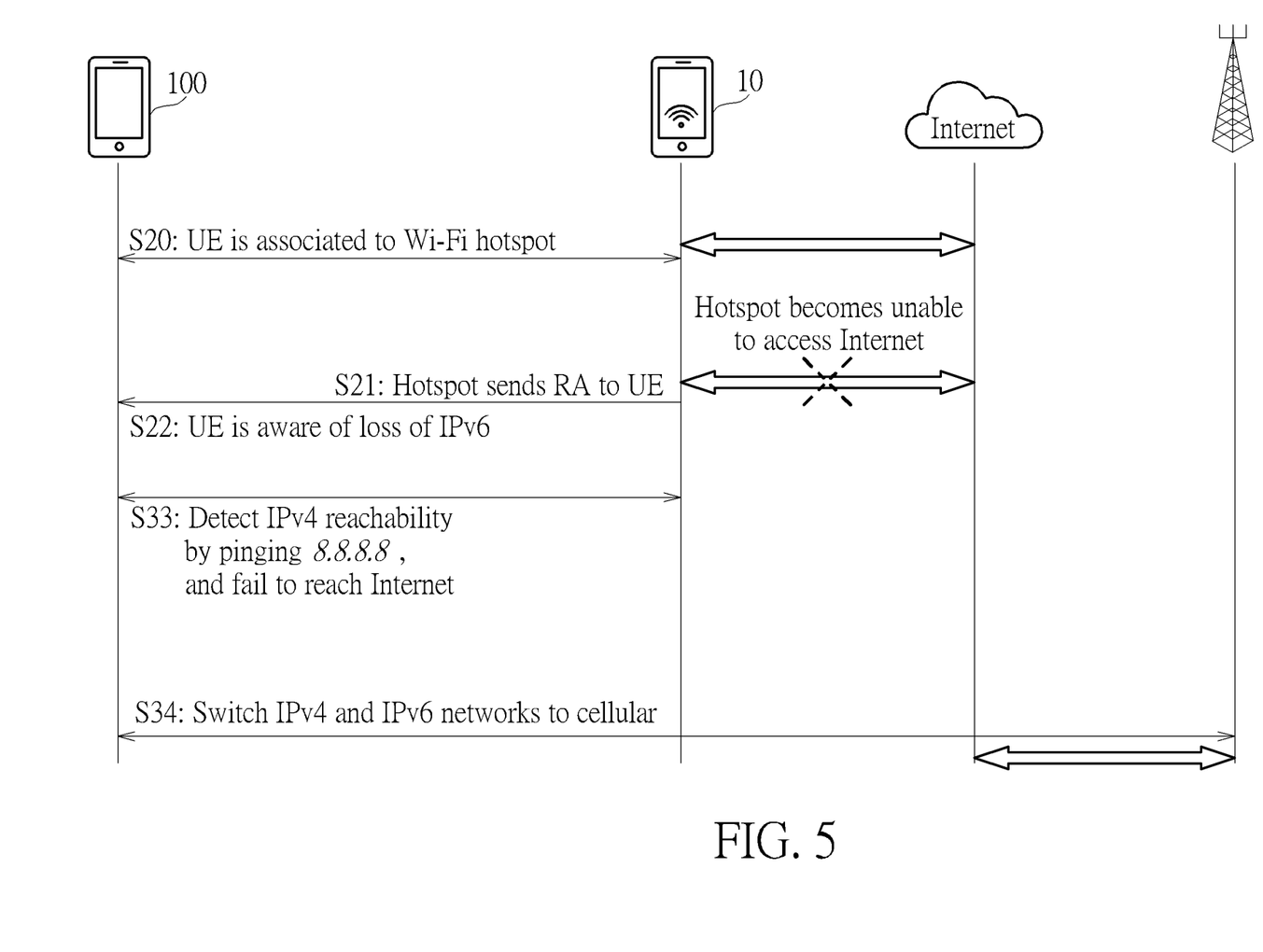
FIG. 5 illustrates a control scheme of the method for performing the Internet reachability management according to an embodiment of the present invention.

FIG. 5 illustrates a control scheme of the method for performing the Internet reachability management according to an embodiment of the present invention. For example, the first access device such as the access device 10 may represent another UE that is configured to be a Wi-Fi hotspot for sharing its network resources (more particularly, its network access path toward an Internet service provider) via the Wi-Fi hotspot, and the second access device may represent the network access device (e.g., the base station) in the 3GPP network. According to some viewpoints, the UE that is configured to be the Wi-Fi hotspot can be regarded as a router.

In Step S20, under control of the processor 110, the UE 100 can be associated to the access device 10 such as the Wi-Fi hotspot (which can be referred to as the hotspot for brevity).

For example, the UE 100 (e.g., the processor 110) may have established the first connection to the access device 10 such as the hotspot. Afterward, at a certain time point, the access device 10 such as the hotspot may become unable to access the Internet due to the occurrence of the disconnection, where an X-shaped symbol depicted with dashed lines may indicate the disconnection.

In Step S21, under control of the processor 11, the access device 10 such as the hotspot can send a RA message (which can be referred to as the RA for brevity) to the UE 100. For example, under control of the processor 11, the access device 10 such as the hotspot can set the indicator IND (e.g., the indicator $IND_X$ and/or the indicator $IND_Y$) to have the value of zero, for indicating that the access device 10 such as the hotspot becomes unable to access the Internet.

In Step S22, when receiving the indicator IND (e.g., the indicator $IND_X$ and/or the indicator $IND_Y$) carried by the RA, the UE 100 (e.g., the processor 110) can be aware of the loss of IPv6 access (labeled "loss of IPv6" for brevity).

In Step S33, in response to receiving the indicator IND (e.g., the indicator $IND_X$ and/or the indicator $IND_Y$) carried by the RA, the UE 100 (e.g., the processor 110) can perform the reachability detection complying with the second protocol such as IPv4 (labeled "Detect IPv4 reachability" for brevity), for example, by pinging 8.8.8.8, and fail to reach the Internet.

In Step S34, the UE 100 (e.g., the processor 110) can switch from the IPv4 and IPv6 networks to the 3GPP network such as the cellular network (labeled "switch IPv4 and IPv6 networks to cellular" for brevity). For example, the UE 100 (e.g., the processor 110) can disconnect the first connection such as the Wi-Fi connection between the UE 100 and the access device 10, and then establish the second connection to the second access device such as the network access device (e.g., the base station) in the 3GPP network, but the present invention is not limited thereto. For another example, the UE 100 (e.g., the processor 110) can disconnect the first connection after establishing the second connection. For yet another example, the UE 100 (e.g., the processor 110) can prevent disconnecting the first connection, and can re-use the first connection later when it is detected that the access device 10 such as the hotspot becomes able to access the Internet again.

As shown in the bottommost of FIG. 5, the UE 100 (e.g., the processor 110) can establish the second connection to the second access device such as the network access device (e.g., the base station) in the 3GPP network, and the UE 100 (e.g., the processor 110) can re-reach the Internet to operate without being hindered by the disconnection. For example, when the UE 100 is trying to access the target device 5, this accessing operation will not be hindered by the disconnection mentioned above, and will not be delayed by the any periodic check. As a result, the overall performance can be enhanced. For brevity, similar descriptions for this embodiment are not repeated in detail here.

According to some embodiments, the UE 100 can be IPv4-compatible and IPv6-compatible, and the first access device such as the access device 10 can be IPv4-compatible and IPv6-compatible. For brevity, similar descriptions for these embodiments are not repeated in detail here.

Regarding the first access device such as the access device 10, some operations in the method for performing the Internet reachability management may be described as follows. According to some embodiments, the method can also be applied to the first access device such as the access device 10, and can be executed by the first access device such as the access device 10, and more particularly, the processor 11. For example, the access device 10 (e.g., the processor 11) can perform the following operations:
(1) the access device 10 (e.g., the processor 11) can establish a connection to the UE 100, such as the first connection mentioned above, and can establish a connection to a network such as the Internet, whereby the UE 100 is able to access the network through the access device 10;
(2) the access device 10 (e.g., the processor 11) can transmit the indicator complying with the first protocol such as IPv6 (e.g., the indicator IND, such as the indicator $IND_X$ and/or the indicator $IND_Y$) to the UE 100 when the connection to the network is disconnected;
(3) the access device 10 (e.g., the processor 11) can receive data complying with the second protocol such as IPv4 from the UE 100 after the transmitting of the indicator (e.g., the indicator IND, such as the indicator $IND_X$ and/or the indicator $IND_Y$); and
(4) the access device 10 (e.g., the processor 11) can transmit the data toward the network according to a destination of the data;
but the present invention is not limited thereto. In addition, the indicator complying with the first protocol such as IPv6 (e.g., the indicator IND) may comprise the parameter representing the router lifetime or the prefix information lifetime in the RA message. For example, the aforementioned at least one indicator (e.g., the one or more indicators) such as the indicator IND may comprise the indicator $IND_X$ and/or the indicator $IND_Y$, where the indicator $IND_X$ may represent the router lifetime, and the indicator $IND_Y$ may represent the prefix information lifetime. More particularly, the access device 10 (e.g., the processor 11) can set the value of the indicator complying with the first protocol such as IPv6 (e.g., the indicator IND) to be zero, for indicating that the connection to the network is disconnected. For brevity, similar descriptions for these embodiments are not repeated in detail here.

According to some embodiments, the connection to the UE 100, such as the first connection, may use the non-3GPP access. For example, this connection may represent the Wi-Fi connection between the UE 100 and the first access device such as the access device 10. In addition, the UE 100 (e.g., the processor 110) can send the data complying with the second protocol such as IPv4 to the access device 10 in order to perform the reachability detection complying with the second protocol such as IPv4. For example, any of the UE 100 (e.g., the processor 110) and the access device 10 (e.g., the processor 11) can use this data as a part in an operation of:
(1) reaching (e.g., accessing) the HTTP server;
(2) reaching (e.g., accessing) the HTTPs server;
(3) reaching (e.g., accessing) the DNS server;
(4) performing the DPD of IKEv2; or
(5) performing the ICMP ping;
but the present invention is not limited thereto. In addition, in any of the above operations, another device belonging to the network, such as the HTTP server, the HTTPs server, the DNS server, etc., can be taken as an example of the destination of the data. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing Internet reachability management, the method being applied to a user equipment (UE), the method comprising:

establishing, by a processor of the UE, a first connection complying with a first protocol to a first access device;

after the first connection complying with the first protocol is established with the first access device, receiving, by the processor, an indicator being a parameter representing a router lifetime or a prefix information lifetime in a router advertisement (RA) message and complying with the first protocol sent from the first access device;

when the indicator has a value of zero indicating that the first connection complying with the first protocol is unavailable, performing, by the processor, a reachability detection complying with a second protocol to the first access device to generate a detection result complying with the second protocol; and in response to the detection result representing that a network is not reachable via the first access device, performing at least one of:

displaying, by a display of the UE, a message or icon to represent the first connection or the network is unavailable;

disconnecting, by the processor, the first connection; and establishing, by the processor, a second connection to a second access device.

2. The method of claim 1, wherein the first protocol is Internet Protocol version 6 (IPv6).

3. The method of claim 1, wherein the first connection uses a non 3rd Generation Partnership Project (non-3GPP) access and the second connection uses a 3rd Generation Partnership Project (3GPP) access or another non-3GPP access.

4. The method of claim 1, wherein the second protocol is Internet Protocol version 4 (IPv4).

5. The method of claim 4, wherein the reachability detection comprises at least one of:

detecting whether a Hypertext Transfer Protocol (HTTP) server can be reached;

detecting whether a Hypertext Transfer Protocol Secure (HTTPs) server can be reached;

detecting whether a Domain Name System (DNS) server can be reached;

performing a Dead Peer Detection of Internet Key Exchange version 2 (DPD of IKEv2); and performing an Internet Control Message Protocol (ICMP) ping.

6. A user equipment (UE), comprising:

a processor, arranged to control operations of the UE;

wherein:

the processor establishes a first connection complying with a first protocol to a first access device;

after the first connection complying with the first protocol is established with the first access device, the processor receives an indicator being a parameter representing a router lifetime or a prefix information lifetime in a router advertisement (RA) message and complying with the first protocol sent from the first access device;

when the indicator has a value of zero indicating that the first connection complying with the first protocol is unavailable, the processor performs a reachability detection complying with a second protocol to the first access device to generate a detection result complying with the second protocol; and in response to the detection result representing that a network is not reachable, the processor performs at least one of:

displaying, by using a display of the UE, a message or icon to represent the first connection or the network is unavailable;

disconnecting the first connection; and establishing a second connection to a second access device.

7. The UE of claim 6, wherein the first protocol is Internet Protocol version 6 (IPv6).

8. The UE of claim 6, wherein the first connection uses a non 3rd Generation Partnership Project (non-3GPP) access and the second connection uses a 3rd Generation Partnership Project (3GPP) access or another non-3GPP access.

9. The UE of claim 6, wherein the second protocol is Internet Protocol version 4 (IPv4).

10. The UE of claim 9, wherein the reachability detection comprises at least one of:

detecting whether a Hypertext Transfer Protocol (HTTP) server can be reached;

detecting whether a Hypertext Transfer Protocol Secure (HTTPs) server can be reached;

detecting whether a Domain Name System (DNS) server can be reached;

performing a Dead Peer Detection of Internet Key Exchange version 2 (DPD of IKEv2); and performing an Internet Control Message Protocol (ICMP) ping.

11. A method for performing Internet reachability management, the method being applied to an access device, the method comprising:

establishing, by a processor of the access device, a connection complying with a first protocol to a user equipment (UE) and a connection to a network, whereby the UE is able to access the network through the access device;

after the first connection complying with the first protocol is established with the access device, transmitting, by the processor, an indicator being a parameter representing a router lifetime or a prefix lifetime in a router advertisement (RA) message complying with the first protocol and having a value of zero to the UE when the connection to the network is disconnected;

receiving, by the processor, data complying with a second protocol from the UE after the transmitting of the indicator; and transmitting the data toward the network according to a destination of the data.

12. The method of claim 11, wherein the first protocol is Internet Protocol version 6 (IPv6) and the second protocol is Internet Protocol version 4 (IPv4).

13. The method of claim 11, wherein the connection to the UE uses a non 3rd Generation Partnership Project (non-3GPP) access.

14. The method of claim 11, wherein the data is used as a part in an operation of:

reaching a Hypertext Transfer Protocol (HTTP) server;

reaching a Hypertext Transfer Protocol Secure (HTTPs) server;

reaching a Domain Name System (DNS) server;

performing a Dead Peer Detection of Internet Key Exchange version 2 (DPD of IKEv2); or performing an Internet Control Message Protocol (ICMP) ping.

* * * * *